United States Patent
Kakimoto

(10) Patent No.: US 10,165,188 B2
(45) Date of Patent: Dec. 25, 2018

(54) OPTICAL APPARATUS, DISPLAY CONTROLLING METHOD, AND NON-TRANSITORY COMPUTER READABLE STORAGE MEDIUM STORING A PROGRAM, THAT DISPLAY OBJECT DISTANCE INFORMATION

(71) Applicant: CANON KABUSHIKI KAISHA, Tokyo (JP)

(72) Inventor: Takeshi Kakimoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/093,153

(22) Filed: Apr. 7, 2016

(65) Prior Publication Data

US 2016/0306135 A1    Oct. 20, 2016

(30) Foreign Application Priority Data

Apr. 16, 2015 (JP) ................................ 2015-084407
Sep. 24, 2015 (JP) ................................ 2015-187479

(51) Int. Cl.
*H04N 5/232*    (2006.01)
*G03B 17/14*    (2006.01)
*G02B 7/10*    (2006.01)

(52) U.S. Cl.
CPC ......... *H04N 5/23293* (2013.01); *G03B 17/14* (2013.01); *G02B 7/102* (2013.01); *H04N 5/23212* (2013.01); *H04N 5/23296* (2013.01)

(58) Field of Classification Search
None
See application file for complete search history.

(56) References Cited

U.S. PATENT DOCUMENTS

| 5,196,879 | A | * | 3/1993 | Hata | G02B 7/102 |
| | | | | | 396/82 |
| 8,730,374 | B2 | | 5/2014 | Sugawara | |
| 2003/0090567 | A1 | * | 5/2003 | Sasaki | G02B 7/28 |
| | | | | | 348/136 |
| 2013/0083234 | A1 | * | 4/2013 | Shigeta | H04N 5/232 |
| | | | | | 348/360 |

FOREIGN PATENT DOCUMENTS

| JP | 04081730 A | 3/1992 |
| JP | 07306356 A | 11/1995 |
| JP | 2011017800 A | 1/2011 |

* cited by examiner

*Primary Examiner* — Justin P. Misleh
(74) *Attorney, Agent, or Firm* — Rossi, Kimms & McDowell LLP

(57) ABSTRACT

In an optical apparatus, when a magnification varying lens is located at a first zoom position, a display unit displays information indicative of an object distance acquired based on the electronic cam data, the first zoom position, and a position of a focusing device detected while the magnification varying lens is being located at the first zoom position. In a period for the position of the magnification varying lens to change from the first zoom position to a second zoom position, the display unit displays the information indicative of the object distance acquired based on the electronic cam data, a zoom position detected by the zoom position detector, and the position of the focusing device at the detected zoom position, which has been calculated based on the electronic cam data and the position of the focusing device corresponding to the first zoom position.

17 Claims, 7 Drawing Sheets

OPTICAL APPARATUS, DISPLAY CONTROLLING METHOD, AND NON-TRANSITORY COMPUTER READABLE STORAGE MEDIUM STORING A PROGRAM, THAT DISPLAY OBJECT DISTANCE INFORMATION

BACKGROUND OF THE INVENTION

Field of the Invention

The present invention relates to an optical apparatus, such as a camera and an interchangeable lens, configured to perform processing for displaying object distance information.

Description of the Related Art

There is known an image pickup lens that can display object distance information calculated based on a position of a focus lens, on a display device such as a liquid crystal panel. There is also known a rear focus type image pickup lens that moves a lens for focusing which is disposed on an image side of the lens that is closest to the object side. The rear focus type image pickup lens can maintain an in-focus state by moving the focus lens so as to correct image plane fluctuations caused when the magnification varying lens is moved.

A distance display apparatus disclosed in Japanese Patent Laid-Open No. ("JP") 7-306356 stores cam information indicative of the position of the focus lens and the position of the magnification varying lens for each object distance so as to maintain the in-focus state. The distance display apparatus displays object distance information on the display device based on the positions of the focus lens and the magnification varying lens and the cam information.

The distance display apparatus disclosed in JP 7-306356 stores cam information for each object distance, and calculates object distance based on the position of the magnification varying lens and the position of the focus lens.

In order to display the correct object distance in zooming in the rear focus type image pickup lens, it is necessary to drive the focus lens so as to make it follow the moving magnification varying lens. If the object distance is calculated while the focus lens is lagging behind in follow-up, an incorrect object distance is calculated. For example, when the magnification varying lens moves too fast, it is difficult to drive the focus lens so as to make it follow the magnification varying lens.

The follow-up lag of the focus lens does not always occur, and may be eliminated as time elapses. After the follow-up lag of the focus lens is eliminated, the object distance can be correctly calculated and thus the display content of the object distance changes before and after the follow-up lag is eliminated. This display content change of the object distance confuses the user.

SUMMARY OF THE INVENTION

The present invention provides an optical apparatus that includes a focusing device configured to move for focusing, a magnification varying lens configured to move for magnification variation, a memory configured to store electronic cam data indicative of a positional relationship between the magnification varying lens and the focusing device set for each object distance so as to maintain an in-focus state, a display unit configured to display information indicative of an object distance, a focus position detector configured to detect a position of the focusing device, a zoom position detector configured to detect a position of the magnification varying lens, and a controller configured to instruct the display unit to display information indicative of the object distance. When the magnification varying lens is located at a first zoom position, the controller instructs the display unit to display the information indicative of the object distance acquired based on the electronic cam data, the first zoom position, and the position of the focusing device detected while the magnification varying lens is being located at the first zoom position. In a period for the position of the magnification varying lens to change from the first zoom position to a second zoom position different from the first zoom position, the controller instructs the display unit to display the information indicative of the object distance acquired based on the electronic cam data, a zoom position detected by the zoom position detector, and the position of the focusing device at the detected zoom position, which has been calculated based on the electronic cam data and the position of the focusing device corresponding to the first zoom position.

Further features of the present invention will become apparent from the following description of exemplary embodiments with reference to the attached drawings.

DESCRIPTION OF THE EMBODIMENTS

A detailed description will now be given of an optical apparatus and a display controlling method according to the present invention, with reference to the accompanying drawings.

Figure 1:
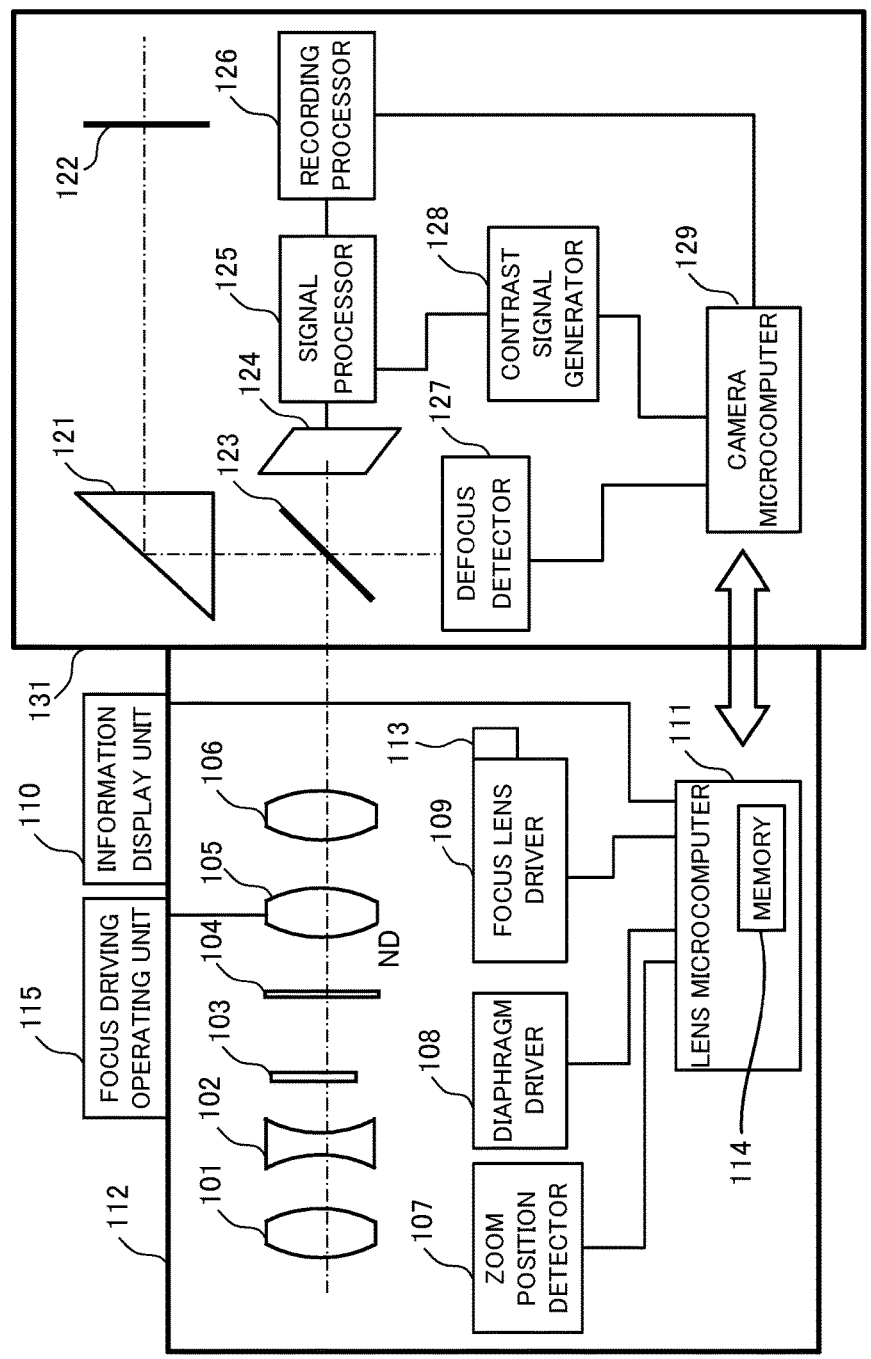
FIG. 1 is a block diagram illustrating a structure of a camera system including an interchangeable lens according to the present invention.

FIG. 1 is a view illustrating a structure of a lens interchangeable type camera system including an interchangeable lens as an optical apparatus. An interchangeable lens 112 is attached to and detached from a camera body 131. Light from an object enters an image pickup optical system provided in the interchangeable lens 112 and is imaged into an object image by the image pickup optical system. The image pickup optical system includes, in order from the object side, a first lens 101, a magnification varying lens (zoom lens) 102, a diaphragm 103, an ND filter 104, a focus lens 105 as a focusing device that is movable in an optical axis direction for focusing, and a second lens 106. Each of the first lens 101, the magnification varying lens 102, the focus lens 105, and the second lens 106 may include a single lens or a plurality of lenses.

The light that exits from the image pickup optical system and enters the camera body 131 is reflected on a main mirror 123 and led to an optical viewfinder 122 via a pentaprism 121. Thereby, a user can observe the object image.

The light that has transmitted through a half-mirror as part of the main mirror 123 is guided to a defocus detector 127 after reflected on an unillustrated sub-mirror. The defocus detector 127 detects a defocus amount of the image pickup optical system using a phase difference detection method, and sends the defocus amount information to a camera microcomputer 129.

The main mirror 123 and the sub-mirror can be retreated from the optical path, and the object image is formed on an image sensor 124 after they are retreated. The image sensor 124 photoelectrically converts an object image and outputs a captured signal as an electric signal. The captured signal is input into a signal processor 125. The signal processor 125 generates an image signal by performing signal processing to the captured signal, such as the A/D conversion, amplification, color correction, and white balancing. The image signal is recorded in a recording medium, an unillustrated semiconductor memory and optical disc by a recording processor 126, and displayed on an electronic viewfinder monitor.

The image signal generated by the signal processor 125 is also sent to the contrast signal generator 128. The contrast signal generator 128 generates a contrast evaluation value signal by extracting a high frequency component from the brightness signal contained in the image signal. The contrast evaluation value signal is a signal having a value corresponding to a contrast state of the image signal, and the generated signal is sent to the camera microcomputer 129.

A lens microcomputer 111 provided in the interchangeable lens 112 mutually communicates with the camera microcomputer 129. The camera microcomputer 129 sends a variety of lens control commands to the lens microcomputer 111. The lens control command contains a focus driving command, a diaphragm driving command, a transmission command of lens information, etc. The lens microcomputer 111 sends various lens information to the camera microcomputer 129. The lens information contains information, such as the position of the magnification varying lens 102, the position of the focus lens 105, the object distance, and the aperture value.

The camera microcomputer 129 and the lens microcomputer 111 serve as both a phase difference AF controller and a contrast AF controller. In the phase difference AF, the camera microcomputer 129 calculates, based on the defocus amount from the defocus detector 127, a moving amount of the focus lens 105 so that the image pickup optical system can be focused on the object, and sends a focus driving command for the phase difference AF including the moving amount information to the lens microcomputer 111. In the contrast AF, the camera microcomputer 129 transmits the focus driving command for the contrast AF to the lens microcomputer 111 so that the focus lens 105 can be moved to the peak position of the contrast evaluation value.

In the interchangeable lens 112, a focus lens driver 109 includes a focus actuator, such as a vibration motor, a stepping motor, and a voice coil motor, and a driving circuit. The lens microcomputer 111 that has received the focus driving command for the phase difference AF controls the focus lens driver 109 so as to move the focus lens 105 in the optical axis direction by the moving amount contained in the focus driving command.

The user can operate a focus ring (focus driving operation unit) 115 and manually drive the focus lens 105. The user can adjust the position of the focus lens 105 by operating the focus ring 115 for manual focus control. The focus control used with the focus ring 115 by the user is referred to as manual focus ("MF"). The lens microcomputer 111 can detect that the focus ring 115 has been manipulated.

A focus position detector 113 includes an encoder, detects the position of the focus lens 105 (focus position), and sends the focus position information to the lens microcomputer 111. When the focus actuator is driven by a pulsed signal like a stepping motor, the lens microcomputer 111 may detect the position of the focus lens 105 by counting the number of pulsed signals through the focus lens driver 109.

A diaphragm driver 108 includes a diaphragm actuator, such as a stepping motor and a voice coil motor, and a driving circuit. The lens microcomputer 111 that has received a diaphragm driving command controls the diaphragm driver 108 so that the aperture value of the diaphragm 103 can be set to a commanded aperture value by the diaphragm driving command.

The ND filter 104 can be inserted into and retreated from the optical path as a result of that the user operates an unillustrated filter insertion mechanism.

The magnification varying lens 102 is moved in the optical axis direction for magnification variations of the image pickup optical system as a result of that the user operates an unillustrated magnification lens driving mechanism. A zoom position detector 107 includes a potentiometer, an encoder, etc., detects the position of the magnification varying lens 102 (zoom position), and sends the zoom position information to the lens microcomputer 111.

An information display unit 110 as a display unit provided onto the interchangeable lens 112 displays various information from the lens microcomputer 111 or the camera microcomputer 129 in accordance with the display command from the lens microcomputer 111 as a controller. The information display unit 110 includes a display device, such as a liquid crystal panel and an organic EL device. The information displayed on the information display unit 110 contains object distance information calculated by the lens microcomputer 111 based on the focus position, as described later. The object distance is a parameter indicative of the distance from the focused object to the image pickup plane.

In the thus-configured camera system, the image pickup optical system in the interchangeable lens 112 is a rear focus type optical system, and it is necessary to correct the (defocus) fluctuation of the image plane position associated with the zoom position. Accordingly, this embodiment maintains the in-focus state to the object located at a predetermined distance by adjusting the focus position associated with a change of the zoom position based on the so-called zoom tracking.

Figure 2B:
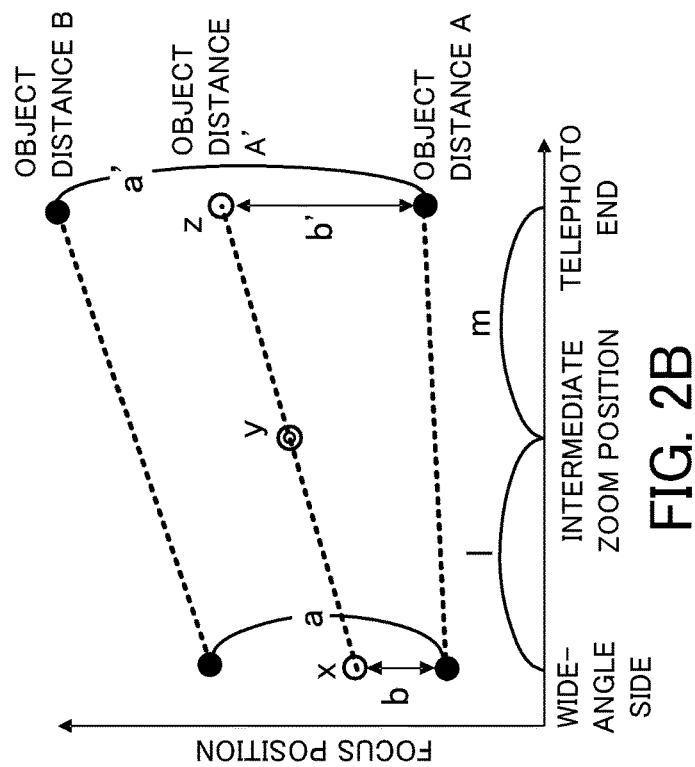
FIG. 2B is a view illustrating a calculating method of the focus position.
Figure 2A:
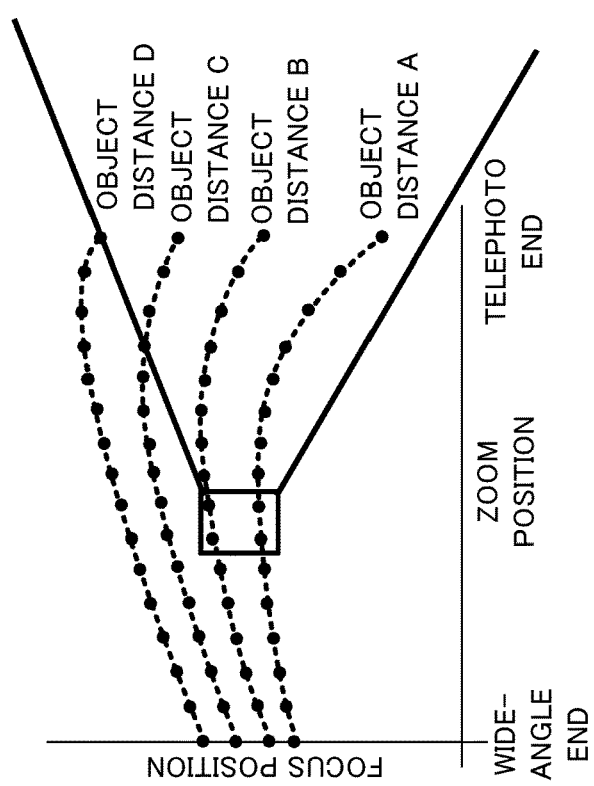
FIG. 2A is a view illustrating a relationship between a zoom (lens) position and a focus (lens) position.

FIG. 2A is data stored in a memory 114, such as a flash ROM in the lens microcomputer 111 for zoom tracking or electronic cam data representative of the relationship between the zoom position and the focus position for each object distance. In FIG. 2A, the horizontal axis is a zoom position, and the longitudinal axis is a focus position.

Due to the limited memory capacity, the actual cam data includes data that contains representative zoom positions and corresponding focus positions, but the representative zoom positions are discretely selected at a plurality of representative object distances A to D that are also discretely selected as illustrated by black dots. The focus position corresponding to one of the representative zoom positions at one of the representative object distances is directly read out of the electronic cam data stored in the memory. The focus position corresponding to the zoom position at the object distance other than the representative object distance and the focus position corresponding to the zoom position other than the representative zoom position are calculated by the interpolation illustrated in FIG. 2B.

FIG. 2B is a partially enlarged view of electronic cam data corresponding to the representative object distances A and B in the electronic data illustrated in FIG. 2A. The horizontal axis represents the zoom position, and the longitudinal axis represents the focus position.

In FIG. 2B, a white dot x represents the current focus position that is a focus position at an object distance A' between the representative object distances A and B. A double-circle focus position y is a focus position corresponding to an intermediate zoom position between a wide-angle side zoom position and a telephoto side zoom position that are representative zoom positions at the object distance A'. A description will now be given of the focus position y to which the focus lens 105 is to move from the current focus position x when the zoom position is changed from the wide-angle side zoom position to the intermediate zoom position while the in-focus state to the object distance A' is maintained. The memory 114 stores data of four focus positions (illustrated by black dots) corresponding to two representative zoom positions at the two representative object distance A and B near the focus position y (at the object distance A' and the intermediate zoom position). Herein, z is a focus position corresponding to the telephoto side zoom position at the object distance A'.

In the wide-angle side zoom position, a distance between the object distances A and B is "a", and a distance between the object distances A and A' is "b". In the telephoto side zoom position, a distance between the object distances A and B is and "a'" distance between the object distances A and A' is "b'". A distance between the wide-angle side zoom position and the intermediate zoom position is "l", and a distance between the telephoto side zoom position and the intermediate zoom position is "m".

In this case, using the fact that a ratio between "a" and "b" is equal to a ratio between "a'" and "b'", the focus position z is calculated. Next, the focus position y is calculated using a ratio between the focus positions x, z, l and m.

Figure 3:
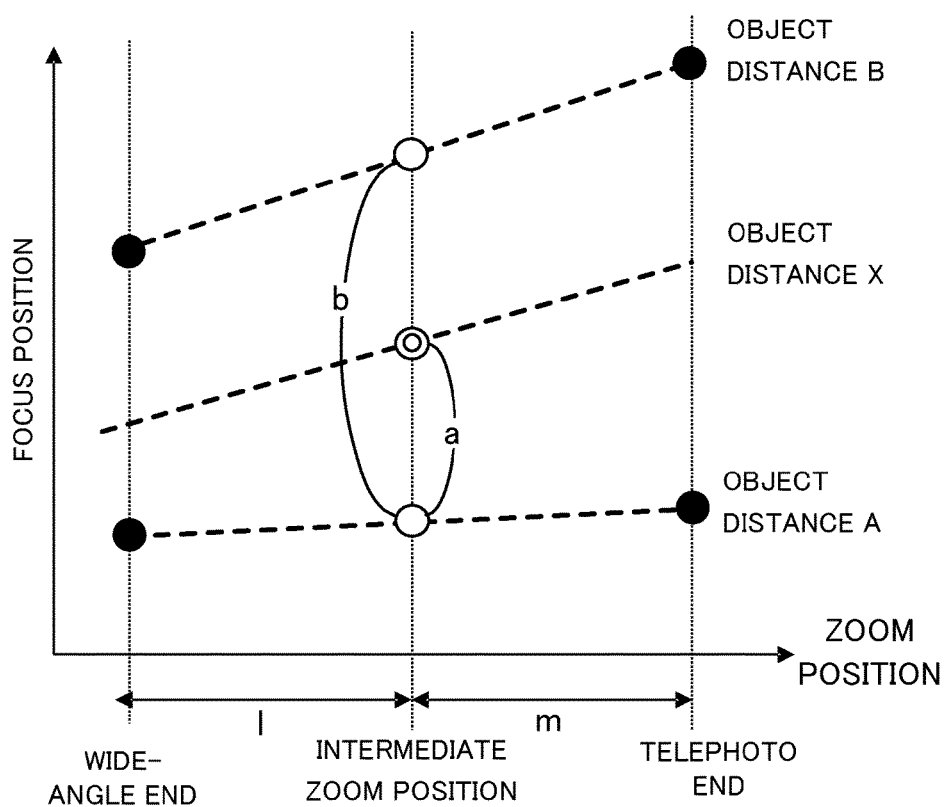
FIG. 3 is a view illustrating a calculating method of an object distance.

A description will now be given of a method for calculating the object distance based on the zoom position and the focus position and FIG. 3 that illustrates part of the electronic cam data corresponding to the representative object distances A and B similar to FIG. 2B. As illustrated in FIG. 2B, the memory 114 stores the four focus positions each corresponding to two representative zoom positions (wide-angle side zoom positions and telephoto side zoom positions) at the two representative object distances A and B illustrated by black dots in FIG. 3. In FIG. 3, the current zoom position and focus position are illustrated by double circles. A description will now be given of a calculation of the object distance X corresponding to the current zoom position and focus position.

In this case, using the ratio between the distance 1 between the wide-angle side zoom position and the current zoom position and distance m between the telephoto side zoom position and the current zoom position, the focus position (white dot) is calculated relative to the current zoom position at the object distances A and B. A ratio between the distance "b" between two white-dot focus positions and the distance "a" between the white dot focus position and the double circle focus position is calculated. Since the reciprocal of the object distance and the focus position have a proportional relationship due to the Gaussian imaging formula, the current object distance X can be calculated from the above ratio of the focus positions.

Figure 4A:
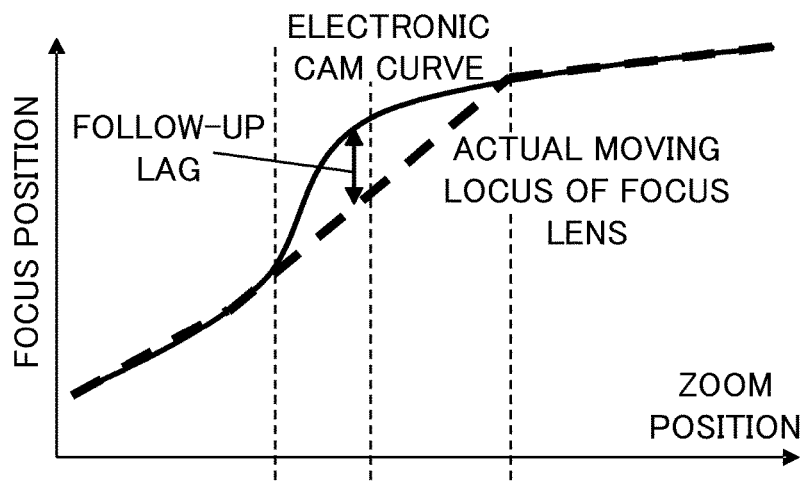
FIGS. 4A and 4B are views illustrating a follow-up lag of a focus lens relative to a movement of a magnification varying lens (zoom lens).
Figure 4B:
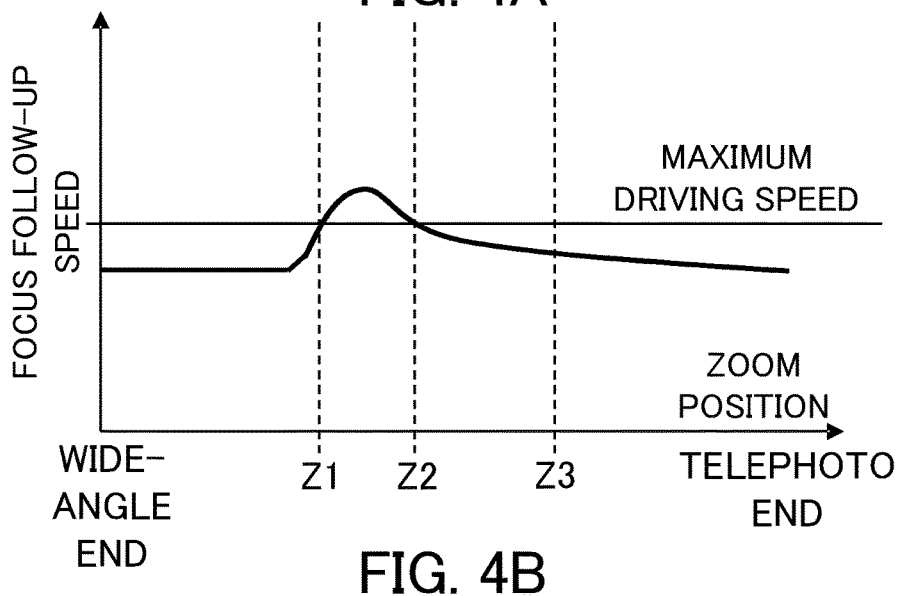

Referring now to FIGS. 4A and 4B, a description will be given of a follow-up lag of the focus lens 105 to a movement of the magnification varying lens 102. In FIG. 4A, the horizontal axis represents the zoom position and the longitudinal axis represents the focus position. The solid line represents the electronic cam curve at a specific object distance, and a broken line represents an actual driving locus of the focus lens 105 when the magnification varying lens 102 is moved at a constant speed. It is understood as illustrated by an arrow in FIG. 4A that when the magnification varying lens 102 is located between a position Z1 and a position Z3, the focus lens 105 cannot move along the electronic cam and lags behind the follow-up. This lag will be referred to as a follow-up lag of the focus lens 105 to the movement of the magnification varying lens 102.

FIG. 4B illustrates a relationship between the zoom position and the focus follow-up speed at each zoom position. The focus follow-up speed represents a driving speed of the focus lens 105 necessary to drive the focus lens 105 along the electronic cum in FIG. 4A. As illustrated in FIG. 4B, the focus follow-up speed exceeds the maximum driving speed of the focus actuator used to drive the focus lens 105, the follow-up lag of the focus lens 105 occurs. Thereafter, the focus follow-up speed becomes lower than the maximum driving speed of the focus actuator, and the follow-up lag is gradually reduced and finally eliminated at the zoom position Z3.

The frequency of the follow-up lag of the focus lens 105 is different according to the shape of the electronic cam curve and the performance of the focus actuator. For example, the follow-up lag is likely to occur when the electronic cam curve is set so that the focus position suddenly changes relative to the change of the zoom position and when the focus actuator has low performance.

Figure 5A:
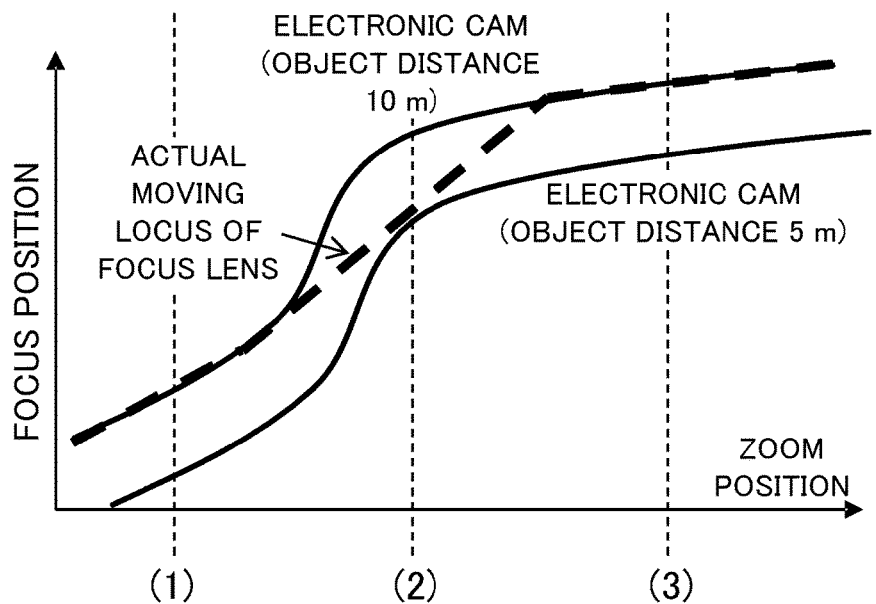
FIGS. 5A and 5B are views illustrating a relationship between the follow-up lag of the focus lens and the object distance display.
Figure 5B:
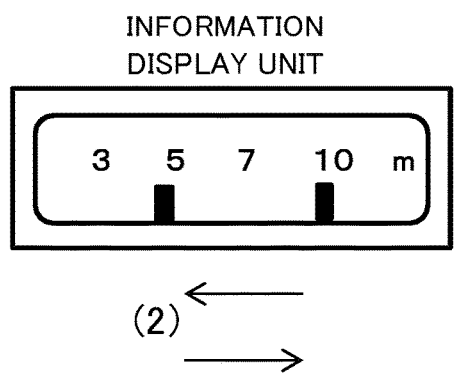

Referring now to FIGS. 5A and 5B, a description will be given of the concrete influence of the follow-up lag of the focus lens 105 in displaying the object distance information. FIG. 5A is a view illustrating the follow-up lag of the focus lens 105. In FIG. 5A, the horizontal axis represents the zoom position, the longitudinal axis represents the focus position. Similar to FIG. 4A, the solid line represents the electronic cam curve at a specific object distance, and the broken line represents the actual driving locus of the focus lens 105 when the magnification varying lens 102 is moved at a constant speed.

As illustrated in FIGS. 5A and 5B, if the object distance is determined based on the current focus position detected by the focus position detector 113 and the current zoom position detected by the zoom position detector 107, the object distance is subject to the follow-up lag of the focus lens 105. Herein, the current object distance is an object distance determined based on the current focus position and the current zoom position. The current object distance is calculated based on the procedure explained with reference to FIG. 3.

FIG. 5B is a view that schematically illustrates the object distance information displayed on the information display unit 110. The current object distance is calculated as 10 m at the zoom positions (1) and (3), and the current object distance is calculated as 5 m at the zoom position (2), due to the influence of the follow-up lag. When the object distance is displayed based on the current object distance, the cursor indicative of the object distance fluctuates with zooming.

Thus, the current object distance is obtained and the information display unit 110 displays the information representing the obtained current object distance when the follow-up lag of the focus lens 105 occurs, the displayed object distance fluctuates and confuses the user. Therefore, the information display unit 110 of one embodiment displays information indicative of the target object distance calculated using the information representing the previously obtained object distance rather than the current object distance, when the follow-up lag of the focus lens is likely to occur.

First Embodiment

This embodiment displays information representing the target object distance rather than the current object distance as the zoom position changes. A description will be given of a method of calculating the target object distance information in a period for the zoom position to move from a first zoom position to a second zoom position different from the first zoom position. Hereinafter, an arbitrary zoom position between the first zoom position and the second zoom position will be referred to as a zoom position X.

Based on a relationship between the electronic cam curve and the focus position obtained when the magnification varying lens is located at the first zoom position, the position of the focus lens 105 (target focus position) to which the focus lens 105 is to be located when the magnification varying lens is located at the zoom position X is calculated. The target object distance is acquired based on the target focus position and the zoom position X, and the information of the target object distance is displayed on the information display unit 110. The target object distance is displayed and less likely to receive influence of the follow-up lag of the focus lens 105. Thus, the displayed object distance is less likely to confuse the user.

A detailed description will be given of a method for acquiring the target object distance. As explained with reference to FIG. 3, the positional relationship between the focus position and the electronic curve at a predetermined zoom position is a predetermined relationship. Since the ratio between the distance "a" and the distance "b" in FIG. 3 is predetermined, the target focus position to be followed can be calculated even when the zoom position changes.

The electronic cam curve to be followed changes when the lens microcomputer 111 receives the focus driving command from the camera microcomputer 129 or when the focus ring 115 is operated from the outside. In other words, unless the focus driving command is received or the focus ring 115 is operated, the electronic cam curve to be followed by the focus lens 105 is maintained. As described above, unless the electronic cam curve to be followed is changed, the target focus position when the zoom position is changed is calculated and the target object distance can be calculated based on the calculated target focus position and zoom position. Thereby, the correct object distance can be displayed without confusing the user.

When no zooming is operated, the follow-up lag of the focus lens 105 does not occur. Therefore, even when the current object distance is determined based on the current focus position and the current zoom position, the correct object distance can be displayed. After the zoom position is changed from the first position to the second position, the current object distance can be calculated according to the above procedure.

When the electronic cam curve which the focus lens 105 is to follow changes, when the focus driving command is received or when the focus ring 115 is operated, the zoom position and the focus position are again detected. The current object distance is calculated based on the detected current zoom and focus positions, a new electronic cam curve is determined which the focus lens 105 is to follow.

While a description has been given of a calculation of the target focus position and the display control of the target object distance obtained based on the target focus position and zoom position X, the target object distance may be determined as follows. In other words, an update of the object distance display is stopped by setting to the target object distance the object distance calculated based on the focus position and the first zoom position acquired when the magnification varying lens 102 is located at the first zoom position. Even when the position of the magnification varying lens 102 changes to the zoom position X, the target object distance calculated with the first zoom position is displayed as it is. By displaying, as the target object distance, the target distance calculated before the position of the magnification varying lens 102 changes, it becomes unnecessary to calculate the object distance in moving the magnification varying lens 102 and the control burden of the lens microcomputer 111 can be significantly lessened. Unless the focus driving command is received or the focus ring 115 is operated, the electronic cam curve is maintained which the focus lens 105 is to follow. Thus, the correct object distance can be displayed without recalculating the target object distance.

According to the method for calculating the target focus position as the zoom position changes, and for calculating the target object distance based on the target focus position and the zoom position X, the more precise object distance can be displayed. For example, when the calculated target object distance has an error at the first zoom position, the incorrect object distance is continuously displayed if the object distance is not calculated in zooming. On the other hand, the precise object distance information can be always displayed by calculating the target object distance whenever the zoom position changes.

Figure 6:
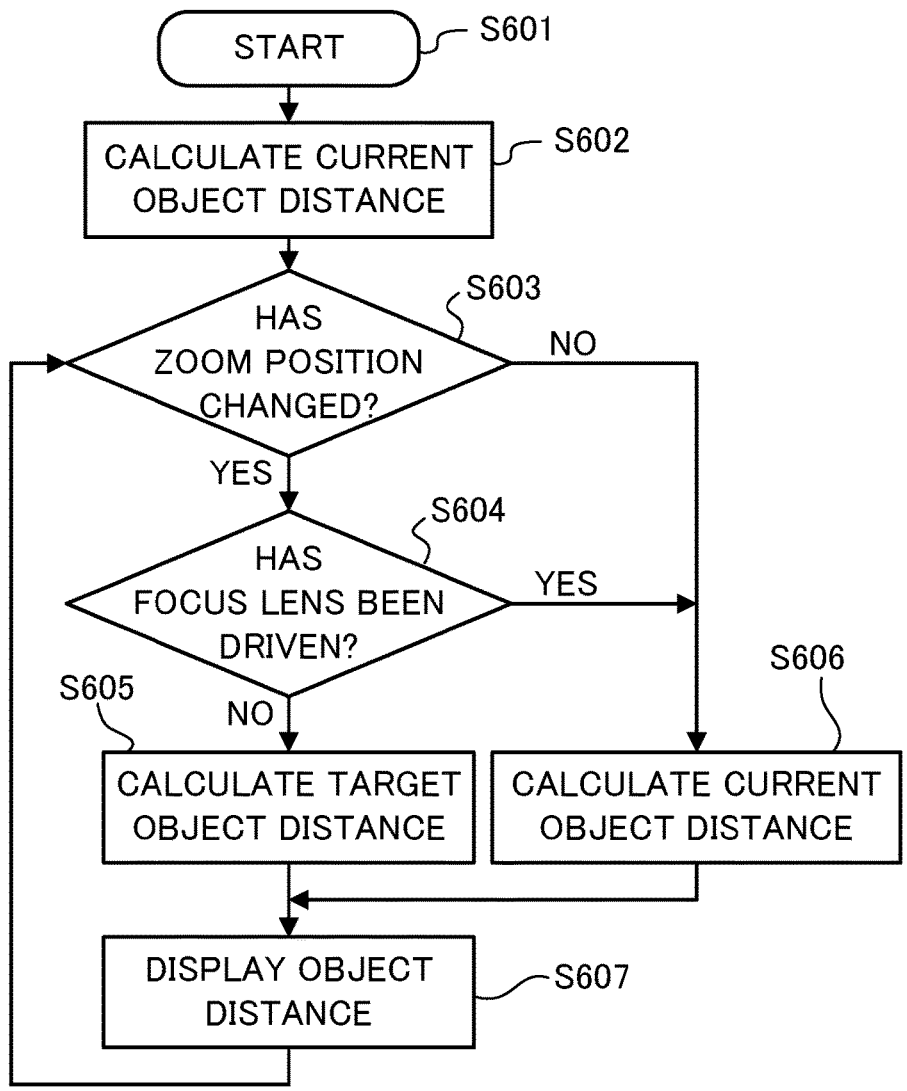
FIG. 6 is a flowchart for explaining a flow for executing display controlling processing according to a first embodiment.

FIG. 6 is a flowchart for explaining the flow for executing the display control according to the first embodiment. This display control is executed by the lens microcomputer 111 as a computer in accordance with the computer program. When the display control starts at Step S601, the current object distance is calculated based on the current zoom position and the current focus position at Step S602. At Step S603, whether or not the zoom position changes is determined. When it is determined that the zoom position has been changed, the flow moves to Step S604 so as to determine whether the focus lens 105 is driven by the focus driving command or by operating the focus ring 115.

When it is determined that the focus lens 105 has not yet been driven, the flow moves to Step S605 so as to calculate the target object distance according to the above procedure. When it is determined that the zoom position has not yet been changed at Step S603, or when it is determined that the focus lens 105 is driven at Step S604, the flow moves to Step S606 so as to calculate the current object distance according to the above procedure. At Step S607, the information display unit 110 displays information indicative of the object distance calculated at Step S605 or Step S606. After the information display unit 110 displays the information representing the object distance, the flow moves back to Step S603.

Second Embodiment

The second embodiment determines which object distance is to be displayed, i.e., the target object distance or the current object distance, according to the moving speed of the magnification varying lens 102. The lens microcomputer 111 calculates the moving speed of the magnification varying lens 102 based on the output from the zoom lens position detector 107.

As described above, as the moving speed of the magnification varying lens 102 becomes higher, the follow-up lag of the focus lens 105 is likely to occur. Thus, in this embodiment, when the moving speed is higher than the predetermined speed, the information display unit 110 displays information indicative of the target object distance. On the other hand, when the moving speed is equal to or lower than the predetermined speed, the follow-up lag of the focus lens 105 is less likely to occur. Thus, the information display unit 110 displays information indicative of the current object distance.

When the follow-up lag of the focus lens 105 is less likely to occur, the current object distance is calculated based on the current zoom position and the current focus position. Thereby, the calculating control of the object distance may be simplified.

Figure 7:
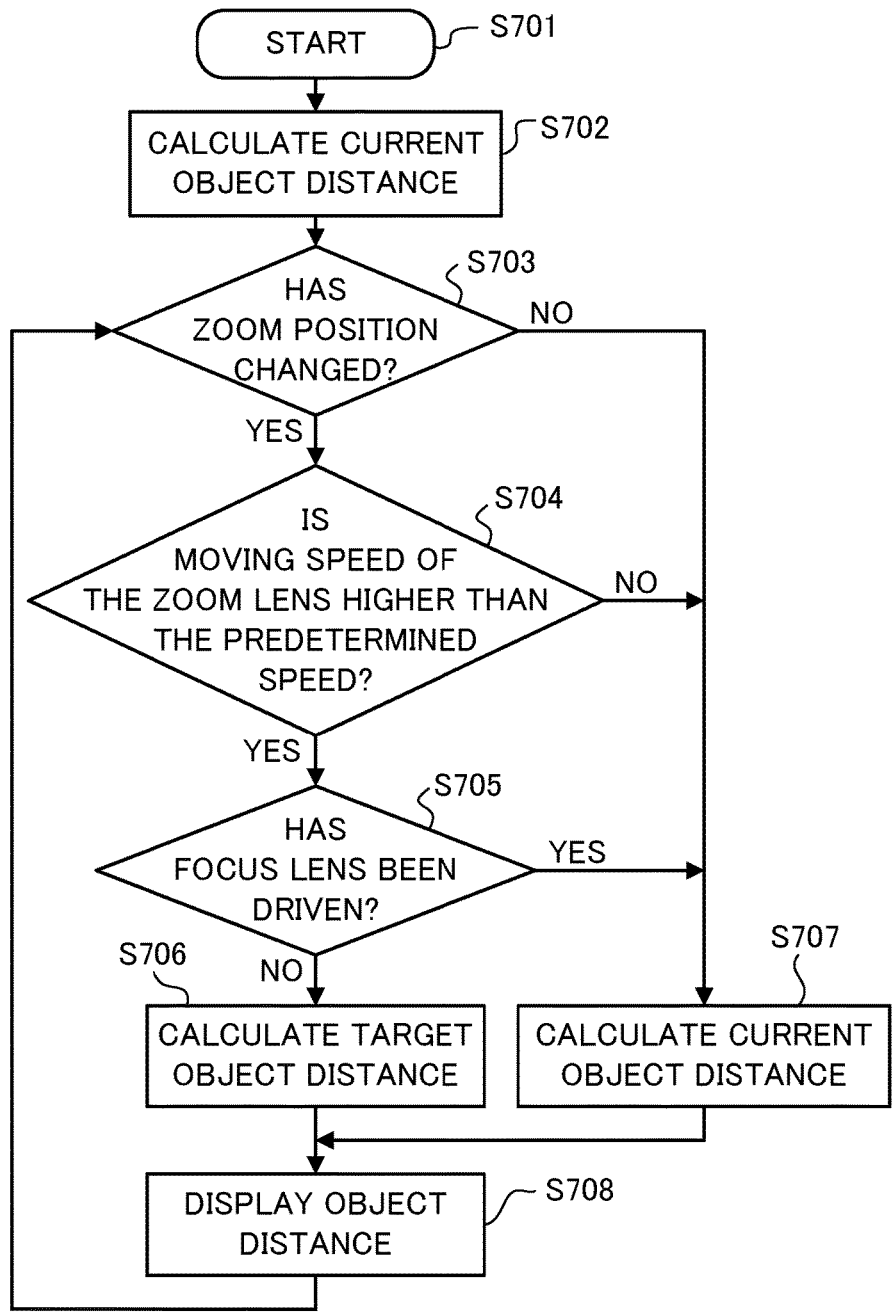
FIG. 7 is a flowchart for explaining a flow for executing display controlling processing according to a second embodiment.

FIG. 7 is a flowchart for explaining the flow for executing the display control according to the second embodiment. This display control is executed by the lens microcomputer 111 as the computer in accordance with the computer program. The display control of this embodiment different from that of the first embodiment is to determine whether the moving speed of the magnification varying lens 102 is higher than the predetermined speed at Step S704. When it is determined that the moving speed of the magnification varying lens 102 is not higher than the predetermined speed at Step S704, the flow moves to Step S707 so as to calculate the current object distance. On the other hand, when it is determined that the moving speed of the magnification lens 102 is equal to or lower than the predetermined speed at Step S704, the flow moves to Step S705 so as to perform control similar to that of the first embodiment.

In each of the above embodiments, the lens microcomputer provided in the interchangeable lens executes the distance display processing. However, the camera microcomputer provided in the camera body as the optical apparatus may execute the distance display processing. Alternatively, a microcomputer provided in the lens integrated type camera as the optical apparatus may execute the distance display processing.

Each of the above embodiments supposes the focus lens 105 as a focusing device that moves in the optical axis direction, but the image sensor 124 may be used as the focusing device that moves in the optical axis direction.

When the lens microcomputer 111 receives information indicative of the object distance from the camera microcomputer 129, the object distance may be displayed based on the received information. For example, in FIG. 5A, the electronic cam of the object distance of 10 m is to be followed before the zoom position changes. The camera microcomputer 129 then sends a follow-up command to the electronic cam of the object distance of 8 m to the lens microcomputer 111. In this case, the lens microcomputer 111 instructs the information display unit 110 to display the information indicative of the object distance of 8 m.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-084407, filed Apr. 16, 2015, and Japanese Patent Application No. 2015-187479, filed Sep. 24, 2015, which are hereby incorporated by reference herein in their entirety.

What is claimed is:

1. An optical apparatus comprising:
a focusing lens configured to move for focusing;
a magnification varying lens configured to move for magnification variation among a plurality of zoom positions, including a first zoom position, a second zoom position different from the first position, and an intermediary zoom position between the first and second zoom positions;
a memory configured to store electronic cam data, the electronic cam data being indicative of a positional relationship between the magnification varying lens and the focusing lens set for each of a predetermined number of representative object distances to maintain an in-focus state;
a display unit configured to display information indicative of an object distance;
a zoom position detector configured to detect a position of the magnification varying lens among the plurality of zoom positions;
a focus position detector configured to detect a position of the focusing lens; and
a controller configured to control the display unit to display information indicative of the object distance,
wherein when the magnification varying lens is being stopped at the first zoom position, the controller controls the display unit to display the information indicative of the object distance acquired based on the electronic cam data stored in the memory, the first zoom position, and the position of the focusing lens detected while the magnification varying lens is being stopped at the first zoom position, and
wherein in a period where the magnification varying lens moves from the first zoom position to the second zoom position, the controller controls the display unit to display the information indicative of the object distance acquired based on the electronic cam data stored in the memory, the intermediary zoom position detected by the zoom position detector, and a target position of the focusing lens to which the focusing lens is to be located when the magnification varying lens is located at the intermediary zoom position, the target position being calculated based on the electronic cam data stored in the memory and the position of the focusing lens detected while the magnification varying lens is at the first zoom position.

2. The optical apparatus according to claim 1, wherein when the magnification varying lens is being stopped at the second zoom position, the controller controls the display unit to display the information indicative of the object distance acquired based on the electronic cam data stored in the memory, the second zoom position, and the position of the focusing lens detected when the magnification varying lens is being stopped at the second zoom position.

3. The optical apparatus according to claim 1, wherein in a period where the magnification varying lens is being stopped, the controller calculates the object distance based on the electronic cam data stored in the memory, the position of the focusing lens detected by the focus position detector, and the position of the magnification varying lens detected by the zoom position detector, and controls the display unit to display the information indicative of the calculated object distance.

4. The optical apparatus according to claim 3, wherein:
when a moving speed of the magnification varying lens is higher than a predetermined speed in the period where the magnification varying lens moves from the first zoom position to the second zoom position, the controller controls the display unit to display the information indicative of the object distance acquired based on the electronic cam data stored in the memory, the zoom position detected by the zoom position detector, and the position of the focusing lens at the detected zoom position calculated based on the electronic cam data stored in the memory and the position of the focusing lens corresponding to the first zoom position, and
when the moving speed of the magnification varying lens is equal to or lower than the predetermined speed, the controller calculates the object distance based on the electronic cam data stored in the memory, the position of the focusing lens detected by the focus position detector, and the position of the magnification varying lens detected by the zoom position detector, and controls the display unit to display the information indicative of the calculated object distance.

5. The optical apparatus according to claim 3, further comprising:
a focus driving operation unit configured to drive the focusing lens,
wherein when the controller receives a driving command of the focusing lens in the period where the magnification varying lens moves from the first zoom position to the second zoom position, the controller calculates the object distance based on the electronic cam data stored in the memory, the focus position detected by the focus position detector, and the zoom position detected by the zoom position detector, and controls the display unit to display information indicative of the calculated object distance.

6. An optical apparatus comprising:
a focusing lens configured to move for focusing;
a magnification varying lens configured to move for magnification variation among a plurality of zoom positions, including a first zoom position, a second zoom position different from the first position, and an intermediary zoom position between the first and second zoom positions;
a memory configured to store electronic cam data, the electronic cam data being indicative of a positional relationship between the magnification varying lens and the focusing lens set for each of a predetermined number of representative object distances to maintain an in-focus state;
a display unit configured to display information indicative of an object distance;
a zoom position detector configured to detect a position of the magnification varying lens among the plurality of zoom positions;
a focus position detector configured to detect a position of the focusing lens; and
a controller configured to control the display unit to display information indicative of the object distance,
wherein when the magnification varying lens is being stopped at the first zoom position, the controller controls the display unit to display the information indicative of the object distance acquired based on the electronic cam data stored in the memory, the first zoom position, and the position of the focusing lens detected while the magnification varying lens is being stopped at the first zoom position, and
wherein in a period where the magnification varying lens moves from the first zoom position to the second zoom position, the controller controls the display unit to display the information indicative of the object distance acquired when the magnification varying lens is being stopped at the first zoom position.

7. The optical apparatus according to claim 6, wherein the controller stops updating the information indicative of the object distance in a period where the magnification varying lens moves from the first zoom position to the second zoom position.

8. The optical apparatus according to claim 6, wherein when the magnification varying lens is being stopped at the second zoom position, the controller controls the display unit to display the information indicative of the object distance acquired based on the electronic cam data stored in the memory, the second zoom position, and the position of the focusing lens detected when the magnification varying lens is being stopped at the second zoom position.

9. The optical apparatus according to claim 6, wherein in a period where the magnification varying lens is being stopped, the controller calculates the object distance based on the electronic cam data stored in the memory, the position of the focusing lens detected by the focus position detector, and the position of the magnification varying lens detected by the zoom position detector, and controls the display unit to display the information indicative of the calculated object distance.

10. The optical apparatus according to claim 9, wherein:
when a moving speed of the magnification varying lens is higher than a predetermined speed in a period where the magnification varying lens moves from the first zoom position to the second zoom position, the controller controls the display unit to display the information indicative of the object distance acquired when the magnification varying lens is being stopped at the first zoom position, and
wherein when the moving speed of the magnification varying lens is equal to or lower than the predetermined speed, the controller calculates the object distance based on the electronic cam data stored in the memory, the position of the focusing lens detected by the focus position detector, and the position of the magnification varying lens detected by the zoom position detector, and controls the display unit to display the information indicative of the calculated object distance.

11. The optical apparatus according to claim 9, further comprising:
a focus driving operation unit configured to drive the focusing lens,
wherein when the controller receives a driving command of the focusing lens in the period where the magnification varying lens moves from the first zoom position to the second zoom position, the controller calculates the object distance based on the electronic cam data, the focus position detected by the focus position detector, and the zoom position detected by the zoom position detector, and controls the display unit to display information indicative of the calculated object distance.

12. A display controlling method for an optical apparatus that includes a focusing lens configured to move for focusing, a magnification varying lens configured to move for magnification variation among a plurality of zoom positions, including a first zoom position and a second zoom position different from the first position, and a display unit configured to display information indicative of an object distance, and has electronic cam data, the electronic cam data being indicative of a positional relationship between the magnification varying lens and the focusing lens set for each of a predetermined number of representative object distances to maintain an in-focus state, the display controlling method comprising the steps of:
detecting a position of the magnification varying lens among the plurality of zoom positions;
detecting a position of the focusing lens when the magnification varying lens is being stopped at the first zoom position;
displaying information indicative of an object distance on the display unit, the object distance being acquired based on the electronic cam data, the first zoom position, and the detected position of the focusing lens, while the magnification varying lens is being stopped at the first zoom position;
detecting the position of the magnification varying lens in a period where the magnification varying lens moves from the first zoom position to the second zoom position;
acquiring a target position of the focusing lens corresponding to the detected position of the magnification varying lens based on the electronic cam data and the target position of the focusing lens corresponding to the first zoom position; and
displaying, on the display unit, the information indicative of the object distance acquired based on the electronic cam data, the detected position of the magnification varying lens, and the position of the focusing lens corresponding to the detected position of the magnification varying lens.

13. A non-transitory computer readable storage medium storing a program executable by a processor of an optical apparatus that includes a focusing lens configured to move for focusing, a magnification varying lens configured to move for magnification variation among a plurality of zoom positions, including a first zoom position and a second zoom position different from the first position, and a display unit configured to display information indicative of an object distance, and has electronic cam data, the electronic cam data being indicative of a positional relationship between the magnification varying lens and the focusing lens set for each of a predetermined number of representative object distances to maintain an in-focus state, for executing a method comprising the steps of:
detecting a position of the magnification varying lens among the plurality of zoom position;
detecting a position of the focusing lens when the magnification varying lens is being stopped at the first zoom position;
displaying information indicative of an object distance on the display unit, the object distance being acquired based on the electronic cam data, the first zoom position, and the detected position of the focusing lens, while the magnification varying lens is being stopped at the first zoom position;
detecting the position of the magnification varying lens in a period where the magnification varying lens moves from the first zoom position to the second zoom position;
acquiring a target position of the focusing lens corresponding to the detected position of the magnification varying lens based on the electronic cam data and the position of the focusing lens corresponding to the first zoom position; and
displaying, on the display unit, the information indicative of the object distance acquired based on the electronic cam data, the intermediary zoom position, and the target position of the focusing lens corresponding to the detected magnification varying lens.

14. A display controlling method for an optical apparatus that includes a focusing lens configured to move for focusing, a magnification varying lens configured to move for magnification variation among a plurality of zoom positions, including a first zoom position and a second zoom position different from the first position, and a display unit configured to display information indicative of an object distance, and has electronic cam data, the electronic cam data being indicative of a positional relationship between the magnification varying lens and the focusing lens set for each of a predetermined number of representative object distances to maintain an in-focus state, the display controlling method comprising the steps of:
detecting a position of the magnification varying lens among the plurality of zoom position;
detecting a position of the focusing lens when the magnification varying lens is being stopped at the first zoom position;
displaying the information indicative of the object distance on the display unit, the object distance being acquired based on the electronic cam data, the first zoom position, and the detected position of the focusing lens, while the magnification varying lens is being stopped at the first zoom position; and
displaying the information indicative of the object distance on the display unit in a period where the magnification varying lens moves from the first zoom position to the second zoom position, the object distance being acquired when the magnification varying lens is being stopped at the first zoom position.

15. A non-transitory computer readable storage medium storing a program executable by a processor of an optical apparatus that includes a focusing lens configured to move for focusing among a plurality of zoom positions, including a first zoom position and a second zoom position different from the first position, a magnification varying lens configured to move for magnification variation, and a display unit configured to display information indicative of an object distance, and has electronic cam data, the electronic cam data being indicative of a positional relationship between the magnification varying lens and the focusing lens set for each of a predetermined number of representative object distances to maintain an in-focus state, for executing a method comprising the steps of:

detecting a position of the magnification varying lens among the plurality of zoom positions;

detecting a position of the focusing lens when the magnification varying lens is being stopped at the first zoom position;

displaying the information indicative of the object distance on the display unit, the object distance being acquired based on the electronic cam data, the first zoom position, and the detected position of the focusing lens, while the magnification varying lens is being stopped at the first zoom position; and displaying the information indicative of the object distance on the display unit in a period where the magnification varying lens moves from the first zoom position to the second zoom position, the object distance being acquired when the magnification varying lens is being stopped at the first zoom position.

16. The optical apparatus according to claim 3, further comprising:

a focus driving operation unit configured to drive the focusing lens, wherein when the controller detects that the focus driving operation unit is operated in the period where the magnification varying lens moves from the first zoom position to the second zoom position, the controller calculates the object distance based on the electronic cam data stored in the memory, the focus position detected by the focus position detector, and the zoom position detected by the zoom position detector, and controls the display unit to display information indicative of the calculated object distance.

17. The optical apparatus according to claim 9, further comprising:

a focus driving operation unit configured to drive the focusing lens, wherein when the controller detects that the focus driving operation unit is operated in the period where the magnification varying lens moves from the first zoom position to the second zoom position, the controller calculates the object distance based on the electronic cam data, the focus position detected by the focus position detector, and the zoom position detected by the zoom position detector, and controls the display unit to display information indicative of the calculated object distance.

* * * * *